(12) United States Patent
Fan et al.

(10) Patent No.: US 8,197,719 B2
(45) Date of Patent: Jun. 12, 2012

(54) ELECTROACTIVE AGGLOMERATED PARTICLES

(75) Inventors: Jiang Fan, San Diego, CA (US); Robert M. Spotnitz, Pleasanton, CA (US)

(73) Assignee: American Lithium Energy Corp., San Marcos, CA (US)

( * ) Notice: Subject to any disclaimer, the term of this patent is extended or adjusted under 35 U.S.C. 154(b) by 454 days.

(21) Appl. No.: 11/872,713

(22) Filed: Oct. 16, 2007

(65) Prior Publication Data

US 2008/0116423 A1  May 22, 2008

Related U.S. Application Data (60) Provisional application No. 60/859,541, filed on Nov. 17, 2006, provisional application No. 60/945,914, filed on Jun. 23, 2007.

(51) Int. Cl.
*H01B 1/00* (2006.01)

(52) U.S. Cl. ............... 252/518.1; 252/500; 252/512; 252/513; 252/519.1; 252/519.3; 252/519.33; 252/520.2; 252/520.21; 252/521.2; 977/773; 977/775; 977/777; 977/778; 977/779

(58) Field of Classification Search .......... 252/500–511, 252/512, 513, 518.1, 519.1, 519.3, 519.33, 252/520.2, 520.21, 521.2; 977/773, 775, 977/777, 778, 779
See application file for complete search history.

(56) References Cited

U.S. PATENT DOCUMENTS

| | | | |
|---|---|---|---|
| 5,738,876 | A | 4/1998 | Enevold |
| 5,910,382 | A | 6/1999 | Goodenough et al. |
| 6,514,640 | B1 | 2/2003 | Armand et al. |
| 6,962,666 | B2 | 11/2005 | Ravet et al. |
| 7,060,238 | B2 | 6/2006 | Saidi et al. |
| 7,087,348 | B2 | 8/2006 | Holman et al. |
| 7,211,350 | B2 | 5/2007 | Amatucci |
| 7,214,446 | B1 | 5/2007 | Bi et al. |
| 2002/0187372 | A1 | 12/2002 | Hall et al. |
| 2004/0029011 | A1 | 2/2004 | Ravet et al. |
| 2004/0140458 | A1* | 7/2004 | Ravet et al. ............ 252/500 |
| 2005/0003274 | A1 | 1/2005 | Armand et al. |
| 2005/0222333 | A1 | 10/2005 | Hsu |
| 2006/0127767 | A1* | 6/2006 | Gauthier et al. ......... 429/221 |
| 2006/0286378 | A1* | 12/2006 | Chiruvolu et al. ....... 428/402 |
| 2007/0026316 | A1 | 2/2007 | Imachi et al. |
| 2007/0031732 | A1 | 2/2007 | Chiang et al. |
| 2007/0057228 | A1 | 3/2007 | Huang et al. |
| 2007/0065724 | A1 | 3/2007 | Barker et al. |

OTHER PUBLICATIONS

Wilcox et al., "Factors Influencing the Quality of Carbon Coatings on LiFePO$_4$," J. Electrochem. Soc. 154:A389-A395 (2007).

Hu et al., "Electrochemical Performance of Sol-Gel Synthesized LiFePO$_4$ in Lithium Batteries," Lawrence Berkeley National Laboratory, Paper LBNL-53002 (2003).

* cited by examiner

*Primary Examiner* — Mark Kopec
*Assistant Examiner* — Tri V Nguyen (57) ABSTRACT

Provided herein are electroactive agglomerated particles, which comprise nanoparticles of a first electroactive material and nanoparticles of a second electroactive materials, and processes of preparation thereof.

14 Claims, 3 Drawing Sheets

ELECTROACTIVE AGGLOMERATED PARTICLES

CROSS REFERENCE TO RELATED APPLICATIONS

This application claims the benefit of U.S. Provisional Application Nos. 60/859,541, filed Nov. 17, 2006; and 60/945,914, filed Jun. 23, 2007. The disclosures of these applications are incorporated by reference herein in their entirety.

FIELD

Provided herein are electroactive agglomerated particles, which comprise nanoparticles of a first electroactive material and nanoparticles of a second electroactive material, and processes of preparation thereof.

BACKGROUND

Figure 2:
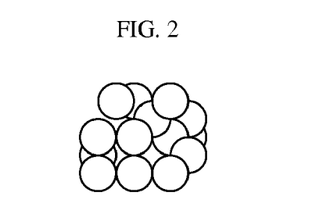
FIG. 2 is a schematic drawing of an agglomerated particle comprising a single type of nanoparticles.

Agglomerated nanoparticles are currently used in batteries. For example, $LiFePO_4$ agglomerated particles are known as are agglomerated particles of $Li_4Ti_5O_{12}$. However, these agglomerated particles typically consist of only a single electroactive material (FIG. 2). For example, $LiFePO_4$ agglomerated particles usually consist of a uniform mixture of $LiFePO_4$ and carbon, while $Li_4Ti_5O_{12}$ agglomerated particles usually consist of a uniform mixture of $Li_4Ti_5O_{12}$ and a conductive additive.

Figure 3:
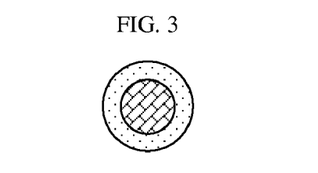
FIG. 3 is a schematic drawing of an electroactive particle of a first electroactive material, coated with a second electroactive material.
Figure 4:
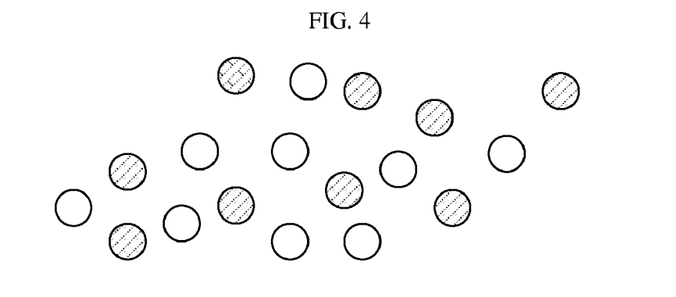
FIG. 4 is a schematic drawing of a blend of two types of nanoparticles, e.g., nanoparticles of a first electroactive material (shaded circles) and nanoparticles of a second electroactive material (clear circles).
Figure 5:
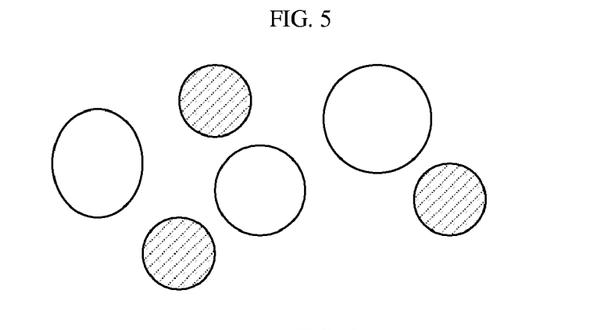
FIG. 5 is a schematic drawing of a blend of two types of microparticles, e.g., nanoparticles of a first electroactive material (shaded circles) and nanoparticles of a second electroactive material (clear circles).
Figure 6:
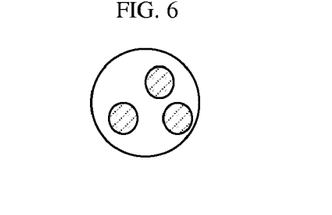
FIG. 6 is a schematic drawing of an agglomerated particle of a first electroactive material (a clear circle) embedded with nanoparticles of a second electroactive material (shaded circles).
Figure 7:
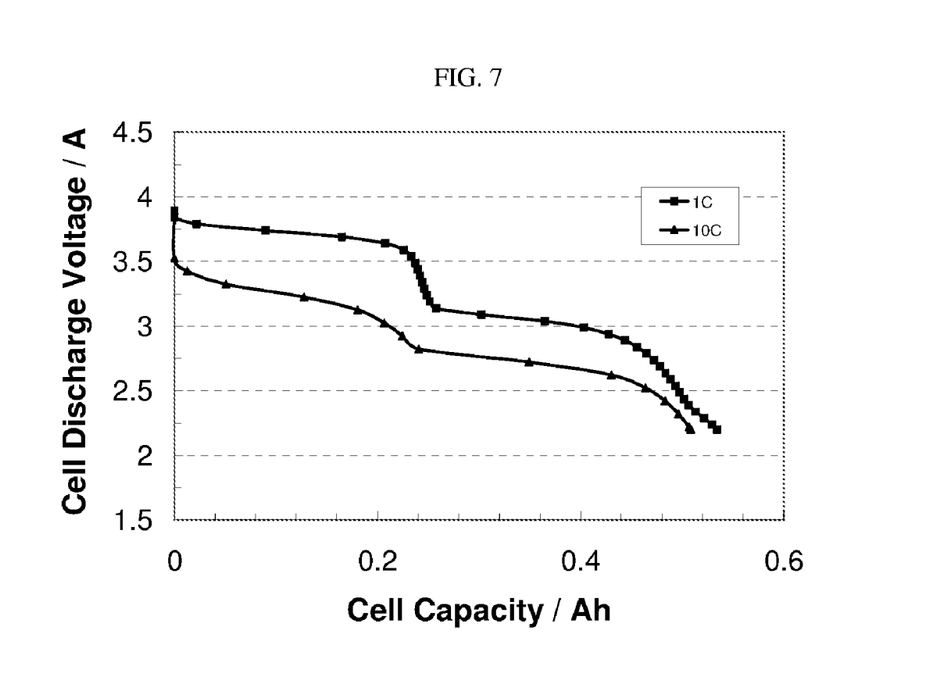
FIG. 7 is a discharge curve of a lithium ion cell with a cathode comprising agglomerated microparticles, which comprise $LiFePO_4$ nanoparticles (70% by weight) and $LiMn_2O_4$ nanoparticles (30% by weight).
Figure 8:
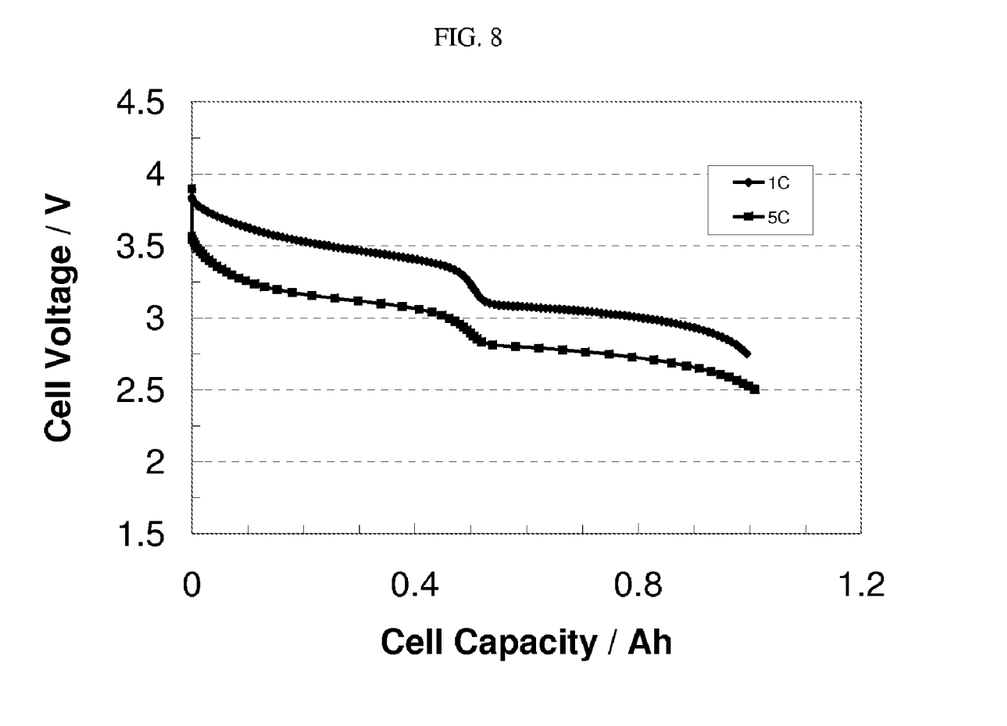
FIG. 8 is a discharge curve of a lithium ion cell with a cathode comprising agglomerated microparticles, which comprise $LiFePO_4$ nanoparticles (50% by weight) and $Li(NiCoMn)_{1/3}O_2$ nanoparticles (50% by weight).
Figure 9:
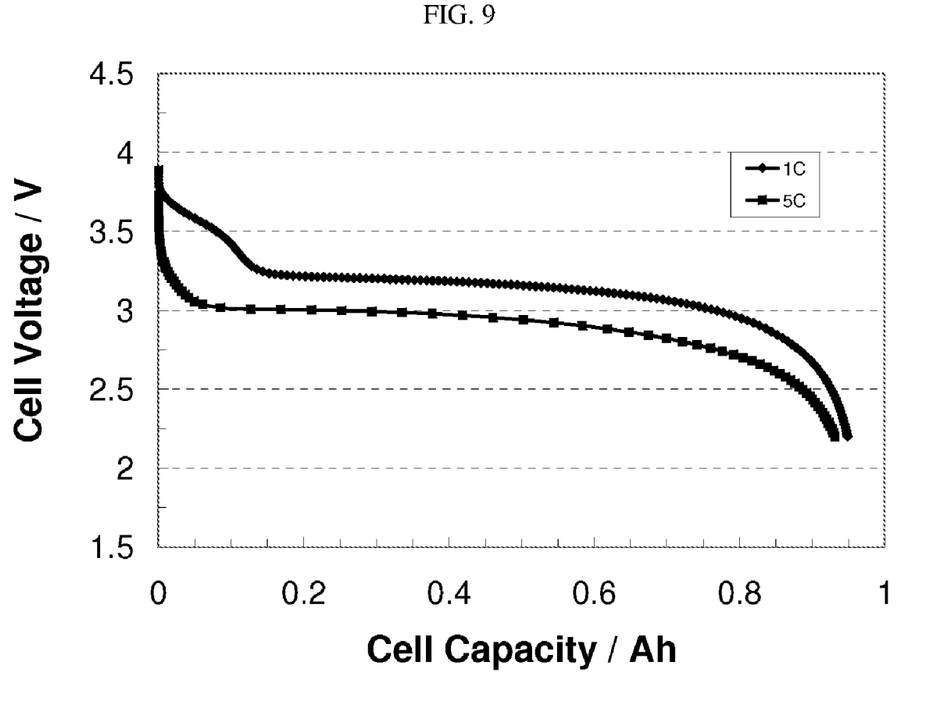
FIG. 9 is a discharge curve of a lithium ion cell with a cathode comprising agglomerated micoparticles, which comprise $LiFePO_4$ nanoparticles (80% by weight) and $Li(NiCoMn)_{1/3}O_2$ nanoparticles (20% by weight).

Examples of some other mixtures of two or more intercalation nanoparticles and optionally additives such as conductivity aids, are shown in FIGS. 3 to 5, including $LiFePO_4$ coated onto $LiNi_xCo_{1-x}O_2$ (FIG. 3), $V_2O_5$ blends with $LiFePO_4$ (FIG. 4), and physical mixtures of micron-sized $LiFePO_4$ and $LiNi_xCo_{1-x}O_2$ particles (FIG. 5).

SUMMARY OF THE DISCLOSURE

Provided herein are electroactive agglomerated particles, which comprise nanoparticles of a first electroactive material and nanoparticles of a second electroactive material. The agglomerated particles may further comprise metal nanoparticles or carbon particles. In addition, the agglomerated particles may each independently comprise a coating.

Also provided herein are agglomerates of nanoparticles of a first electroactive material and nanoparticles of a second electroactive material, in combination with one or more binders. The agglomerates may further comprise metal nanoparticles or carbon particles.

Further provided herein are electroactive agglomerated particles, which comprise a first electroactive material and nanoparticles of a second electroactive material, wherein the nanoparticles of second the electroactive material are embedded in the particles of the first electroactive material.

Provided herein is a method for preparing the agglomerates of nanoparticles of a first electroactive material and nanoparticles of a second electroactive material, in combination with one or more binders. The method comprises mixing nanoparticles of a first electroactive material, nanoparticles of a second electroactive material, and one or more binders together. In certain embodiments, the method further comprises heating the agglomerates at an elevated temperature.

DETAILED DESCRIPTION

Provided herein are electroactive agglomerated particles, which comprise nanoparticles of a first electroactive material and nanoparticles of a second electroactive material, and processes of preparation thereof. Also provided herein are electroactive agglomerated particles, which comprise a first electroactive material and nanoparticles of a second electroactive material, wherein the nanoparticles of the second electroactive material are embedded in the particle of the first electroactive material.

Figure 1:
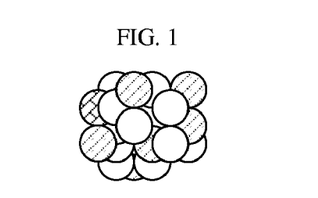
FIG. 1 is a schematic drawing of an agglomerated particle comprising two types of nanoparticles, e.g., nanoparticles of a first electroactive material (shaded circles) and nanoparticles of a second electroactive material (clear circles).

Agglomerated Particles:

Electroactive agglomerated particles are useful in rechargeable lithium batteries. FIG. 1 shows an agglomerated particle of the present disclosure. The agglomerated particles comprise two or more different nanoparticles.

In one embodiment, provided herein are electroactive agglomerated particles comprising two or more types of nanoparticles. In one embodiment, the two or more types of nanoparticles each comprise different electroactive material. In another embodiment, the first type is nanoparticles of a first type first electroactive material, and the second type is nanoparticles of a second electroactive material.

In another embodiment, the electroactive agglomerated particles are provided as microparticles to increase the particle flowability. In certain embodiments, the electroactive agglomerated particles have an average particle size ranging from about 0.1 to about 100 µm, from about 1 to about 50 µm, from about 1 to about 20 µm, from about 1 to about 15 µm, or from about 1 to about 5 µm. In certain embodiments, the electroactive agglomerated particles have an average surface area ranging from about 0.1 to about 100 $m^2/g$, from about 1 to about 50 $m^2/g$, from about 2 to about 20 $m^2/g$, from about 5 to about 20 $m^2/g$, or from about 10 to about 15 $m^2/g$. In certain embodiments, the agglomerated particles have such particle size distribution that 10% of the electroactive agglomerated particles have a particle size of about 0.05 μm, about 0.1 μm, or about 1 μm; and 90% of the electroactive agglomerated particles have a particle size of about 500 μm, about 100 μm, about 50 μm, about 20 μm, about 15 μm, or about 5 μm. In certain embodiments, the particle size distribution is that 10% of the electroactive agglomerated particles have a particle size of 1 μMm and 90% of the electroactive agglomerated particles have a particle size of 15 μm.

In certain embodiments, each type of nanoparticles in the electroactive agglomerated particles independently have an average particle size ranging from about 1 to about 500 nm, from about 1 to about 200 nm, or from about 2 to about 100 nm. Furthermore, each type of nanoparticles in the electroactive agglomerated particles may independently have various shapes, including, but not limited to, sphere, fibril, or platelet. For example, $V_2O_5$ fibrils can be mixed with $LiFePO_4$ spheres.

The agglomerated particles can further comprise one or more additives, such as carbon. Alternatively, the agglomerated particles can further comprise metals (such as Al, Ti, or Cr), or metal oxides, such as aluminum oxide or zirconium oxide.

The agglomerated particles can be subsequently coated to provide additional desired chemical and/or physical properties, such as chemical inertness (by coating with $Al_2O_3$ or ZnO, for example) or electrical conductivity (by coating with, e.g., ionic conductors).

In one embodiment, the electroactive agglomerated particles provided herein comprise two types of nanoparticles, nanoparticles of a first electroactive material, and nanoparticles of a second electroactive material.

In one embodiment, the first electroactive material is a lithium compound. In another embodiment, the first electroactive material is a lithium phosphate compound. In yet another embodiment, the first electroactive material is $LiMPO_4$, wherein M is a transition metal. In yet another embodiment, M is a transition metal selected from the group consisting of Ti, V, Cr, Mn, Fe, Co, and Ni. In yet another embodiment, the first electroactive material is $LiFePO_4$. In yet another embodiment, the first electroactive material is $LiMnPO_4$. In yet another embodiment, the first electroactive material is $LiVPO_4$. In yet another embodiment, the first electroactive material is $AM^a_{1-x}M^b_xPO_4$, wherein A is Li, Na, or a mixture thereof; $M^a$ is Fe, Co, Mn, or a mixture thereof; $M^b$ is Mg, Ca, Zn, Ni, Co, Cu, Al, B, Cr, Nb, or a mixture thereof; and x is from about 0.01 to about 0.99, from about 0.01 to about 0.5, from about 0.01 to about 0.30, or from about 0.01 to about 0.15. In yet another embodiment, the first electroactive material is $LiM^a_{1-x}M^b_xPO_4$. In still another embodiment, the first electroactive material is $NaM^a_{1-x}M^b_xPO_4$.

In another embodiment, the second electroactive material is a metal oxide. In another embodiment, the second electroactive material is selected from the group consisting of $LiCoO_2$, $LiNiCoO_2$, $LiNi_xCo_{1-x}O_2$, wherein x is from about 0.05 to about 0.95, from about 0.1 to about 0.90, from about 0.2 to about 0.5, or from about 0.2 to about 0.4, $Li(NiMnCo)_{1/3}O_2$, $Li(NiMn)_{1/2}O_2$, and $LiV_2O_5$. In yet another embodiment, the second electroactive material is $LiCoO_2$. In yet another embodiment, the second electroactive material is $LiNiCoO_2$. In yet another embodiment, the second electroactive material is $LiNi_xCo_{1-x}O_2$, wherein x is from about 0.05 to about 0.95, from about 0.1 to about 0.90, from about 0.2 to about 0.5, or from about 0.2 to about 0.4. In yet another embodiment, the second electroactive material is $LiNi_xCo_{1-x}O_2$, wherein x is from about 0.2 to about 0.5, from about 0.2 to about 0.4, or about 0.3. In yet another embodiment, the second electroactive material is $Li(NiMnCo)_{1/3}O_2$. In yet another embodiment, the second electroactive material is $Li(NiMn)_{1/2}O_2$. In yet another embodiment, the second electroactive material is $LiV_2O_5$. In yet another embodiment, the second electroactive material is $LiNi_xMn_yCo_{1-x-y}O_2$, wherein x and y are each independently ranging from 0 to about 0.95, from about 0.01 to about 0.9, from about 0.05 to about 0.80, from about 0.1 to about 0.5, or from 0.2 to about 0.4, and x+y is less than 1. In still another embodiment, the second electroactive material is $LiNi_xMn_yCo_{1-x-y}O_2$, wherein x and y are 0.33.

In one embodiment, the electroactive agglomerated particles provided herein are microparticles comprising nanoparticles of $LiFePO_4$ (type 1) and nanoparticles of $LiNi_xCo_{1-x}O_2$ (type 2), wherein x is no less than 0 and no greater than 1, from about 0.05 to about 0.95, from about 0.1 to about 0.90, from about 0.2 to about 0.5, or from about 0.2 to about 0.4. In another embodiment, the second electroactive material is $LiNi_xCo_{1-x}O_2$, wherein x is from about 0.2 to about 0.5, from about 0.2 to about 0.4, or about 0.3.

In yet another embodiment, the electroactive agglomerated particles provided herein are microparticles comprising nanoparticles of $LiMnPO_4$ (type 1) and nanoparticles of $LiNi_xCo_{1-x}O_2$ (type 2), wherein x is no less than 0 and no greater than 1, from about 0.05 to about 0.95, from about 0.1 to about 0.90, from about 0.2 to about 0.5, or from about 0.2 to about 0.4. In yet another embodiment, the second electroactive material is $LiNi_xCo_{1-x}O_2$, wherein x is from about 0.2 to about 0.5, from about 0.2 to about 0.4, or about 0.3.

In still another embodiment, the electroactive agglomerated particles provided herein are microparticles comprising nanoparticles of $LiFePO_4$ (type 1) and nanoparticles of $V_2O_5$ (type 2).

In one embodiment, the agglomerated particles comprise from about 1 to about 99%, from about 30 to about 95%, from about 50 to about 90%, from about 60% to about 90%, or from about 80% to 90% by weight of the nanoparticles (type 1) of the first electroactive material; and from about 99 to about 1%, from about 70 to about 5%, from about 50 to about 10%, from about 40 to about 10%, or from about 20 to about 10% by weight of the nanoparticles (type 2) of the second electroactive material. In another embodiment, the agglomerated particles comprise from about 50 to about 90% by weight of the nanoparticles of the first electroactive material and from about 50 to about 10% by weight of the nanoparticles of the second electroactive material. In yet another embodiment, the agglomerated particles comprise from about 60 to about 90% by weight of the nanoparticles of the first electroactive material and from about 40 to about 10% by weight of the nanoparticles of the second electroactive material. In still another embodiment, the agglomerated particles comprise from about 80 to about 90% by weight of the nanoparticles of the first electroactive material and from about 20 to about 10% by weight of the nanoparticles of the second electroactive material.

One of the advantages of the agglomerated particles is that these electroactive particles can be used to make electrodes using conventional processing techniques, such as reverse roll coating or doctor blade coating.

Another advantage is that one of the two electroactive materials can enhance the electrical or ionic conductivity of the other without reducing specific capacity. For example, with the agglomerated particles of $LiFePO_4$ and $LiNi_xCo_{1-x}O_2$ nanoparticles, the voltage behaviors of both the $LiFePO_4$ and $LiNi_xCo_{1-x}O_2$ materials are retained, so that the agglomerated particles behave as a superposition of the two.

Also provided herein are agglomerates comprising two or more types of nanoparticles, in combination with one or more binders. In one embodiment, the two or more types of nanoparticles each comprise different electroactive material. In another embodiment, the first type is nanoparticles of a first electroactive material, and the second type is nanoparticles of a second electroactive material.

In one embodiment, the agglomerates provided herein are microparticles. In certain embodiments, the agglomerates have an average particle size ranging from about 0.1 to about 100 µm, from about 1 to about 50 µm, from about 1 to about 20 µm, from about 1 to about 15 µm, or from about 1 to about 5 µm. In certain embodiments, agglomerates have an average surface area ranging from about 0.1 to about 100 m$^2$/g, from about 1 to about 50 m$^2$/g, from about 2 to about 20 m$^2$/g, from about 5 to about 20 m$^2$/g, or from about 10 to about 15 m$^2$/g. In certain embodiments, the agglomerates have such particle size distribution that 10% of the agglomerates have a particle size of about 0.05 µm, about 0.1 µm, or about 1 µm; and 90% of the agglomerates have a particle size of about 500 µm, about 100 µm, about 50 µm, about 20 µm, about 15 µm, or about 5 µm. In certain embodiments, the particle size distribution is that 10% of the agglomerates have a particle size of 1 µm and 90% of the agglomerates have a particle size of 15 µm.

In certain embodiments, each type of nanoparticles in the agglomerates independently have an average particle size ranging from about 1 to about 500 nm, from about 1 to about 200 nm, or from about 2 to about 100 nm. Furthermore, each type of nanoparticles in the agglomerates may independently have various shapes, including, but not limited to, sphere, fibril, or platelet.

The agglomerates can further comprise one or more additives, such as carbon. Alternatively, the agglomerates can further comprise metals (such as Al, Ti, or Cr), or metal oxides, such as aluminum oxide or zirconium oxide.

In one embodiment, the agglomerates provided herein comprise two types of nanoparticles, nanoparticles of a first electroactive material, and nanoparticles of a second electroactive material.

In one embodiment, the first electroactive material is a lithium compound. In another embodiment, the first electroactive material is a lithium phosphate compound. In yet another embodiment, the first electroactive material is LiMPO$_4$, wherein M is a transition metal. In yet another embodiment, M is a transition metal selected from the group consisting of Ti, V, Cr, Mn, Fe, Co, and Ni. In yet another embodiment, the first electroactive material is LiFePO$_4$. In yet another embodiment, the first electroactive material is LiMnPO$_4$. In yet another embodiment, the first electroactive material is LiVPO$_4$. In yet another embodiment, the first electroactive material is AM$^a{}_{1-x}$M$^b{}_x$PO$_4$, wherein A is Li, Na, or a mixture thereof; M$^a$ is Fe, Co, Mn, or a mixture thereof; M$^b$ is Mg, Ca, Zn, Ni, Co, Cu, Al, B, Cr, Nb, or a mixture thereof; and x is from about 0.01 to about 0.99, from about 0.01 to about 0.5, from about 0.01 to about 0.30, or from about 0.01 to about 0.15. In yet another embodiment, the first electroactive material is LiM$^a{}_{1-x}$M$^b{}_x$PO$_4$. In still another embodiment, the first electroactive material is NaM$^a{}_{1-x}$M$^b{}_x$PO$_4$.

In another embodiment, the second electroactive material is a metal oxide. In another embodiment, the second electroactive material is selected from the group consisting of LiCoO$_2$, LiNiCoO$_2$, LiNi$_x$Co$_{1-x}$O$_2$, wherein x is from about 0.05 to about 0.95, from about 0.1 to about 0.90, from about 0.2 to about 0.5, or from about 0.2 to about 0.4, Li(NiMnCo)$_{1/3}$O$_2$, Li(NiMn)$_{1/2}$O$_2$, and LiV$_2$O$_5$. In yet another embodiment, the second electroactive material is LiCoO$_2$. In yet another embodiment, the second electroactive material is LiNiCoO$_2$. In yet another embodiment, the second electroactive material is LiNi$_x$Co$_{1-x}$O$_2$, wherein x is from about 0.05 to about 0.95, from about 0.1 to about 0.90, from about 0.2 to about 0.5, or from about 0.2 to about 0.4. In yet another embodiment, the second electroactive material is LiNi$_x$Co$_{1-x}$O$_2$, wherein x is from about 0.2 to about 0.5, from about 0.2 to about 0.4, or about 0.3. In yet another embodiment, the second electroactive material is Li(NiMnCo)$_{1/3}$O$_2$. In yet another embodiment, the second electroactive material is Li(NiMn)$_{1/2}$O$_2$. In yet another embodiment, the second electroactive material is LiV$_2$O$_5$. In yet another embodiment, the second electroactive material is LiNi$_x$Mn$_y$Co$_{1-x-y}$O$_2$, wherein x and y are each independently ranging from 0 to about 0.95, from about 0.01 to about 0.9, from about 0.05 to about 0.80, from about 0.1 to about 0.5, or from 0.2 to about 0.4, and x+y is less than 1. In still another embodiment, the second electroactive material is LiNi$_x$Mn$_y$Co$_{1-x-y}$O$_2$, wherein x and y are 0.33.

In one embodiment, the first electroactive material is LiFePO$_4$. In another embodiment, the second electroactive material is LiCoO$_2$. In yet another embodiment, the second electroactive material is LiNiCoO$_2$. In yet another embodiment, the second electroactive material is LiNi$_x$Co$_{1-x}$O$_2$, wherein x is no less than 0 and no greater than 1, from about 0.05 to about 0.95, from about 0.1 to about 0.90, from about 0.2 to about 0.5, or from about 0.2 to about 0.4. In another embodiment, the second electroactive material is LiNi$_x$Co$_{1-x}$O$_2$, wherein x is from about 0.2 to about 0.5, from about 0.2 to about 0.4, or about 0.3. In yet another embodiment, the second electroactive material is Li(NiMnCo)$_{1/3}$O$_2$. In yet another embodiment, the second electroactive material is Li(NiMn)$_{1/2}$O$_2$. In still another embodiment, the second electroactive material is LiV$_2$O$_5$.

In one embodiment, the agglomerates provided herein are microparticles comprising nanoparticles of LiFePO$_4$ (type 1) and nanoparticles of LiNi$_x$Co$_{1-x}$O$_2$ (type 2), wherein x is no less than 0 and no greater than 1, from about 0.05 to about 0.95, from about 0.1 to about 0.90, from about 0.2 to about 0.5, or from about 0.2 to about 0.4. In another embodiment, the second electroactive material is LiNi$_x$Co$_{1-x}$O$_2$, wherein x is from about 0.2 to about 0.5, from about 0.2 to about 0.4, or about 0.3.

In yet another embodiment, the agglomerates are microparticles comprising nanoparticles of LiMn$_2$O$_4$ (type 1) and nanoparticles of LiNi$_x$Co$_{1-x}$O$_2$ (type 2), wherein x is no less than 0 and no greater than 1, from about 0.05 to about 0.95, from about 0.1 to about 0.90, from about 0.2 to about 0.5, or from about 0.2 to about 0.4. In another embodiment, the second electroactive material is LiNi$_x$Co$_{1-x}$O$_2$, wherein x is from about 0.2 to about 0.5, from about 0.2 to about 0.4, or about 0.3.

In still another embodiment, the agglomerates provided herein are microparticles comprising nanoparticles of LiFePO$_4$ (type 1) and nanoparticles of V$_2$O$_5$ (type 2). In certain embodiments, the first electroactive material is a lithium compound. In certain embodiments, the first electroactive material is LiMPO$_4$, wherein M is a transition metal. In certain embodiments, M is a transition metal selected from the group consisting of Ti, V, Cr, Mn, Fe, Co, and Ni. In certain embodiments, the first electroactive material is LiFePO$_4$. In certain embodiments, the first electroactive material is LiMnPO$_4$. In certain embodiments, the first electroactive material is LiVPO$_4$.

In certain embodiments, the second electroactive material is a metal oxide. In certain embodiments, the second electroactive material is selected from the group consisting of LiCoO$_2$, LiNiCoO$_2$, Li(NiMnCo)$_{1/3}$O$_2$, Li(NiMn)$_{1/2}$O$_2$, and LiV$_2$O$_5$. In certain embodiments, the first electroactive material is LiFePO$_4$. In certain embodiments, the second electroactive material is LiCoO$_2$. In certain embodiments, the second electroactive material is LiNiCoO$_2$. In certain embodiments, the second electroactive material is Li(NiMnCo)$_{1/3}$O$_2$. In certain embodiments, the second electroactive material is Li(NiMn)$_{1/2}$O$_2$. In certain embodiments, the second electroactive material is LiV$_2$O$_5$.

Suitable binders for use in the agglomerates provided herein include, but are not limited to, coal tar, solid ionic conductors, asphalt pitch, and polymeric binders, such as polytetrafluoroethylene (PTFE), carboxymethyl cellulose (CMC), polyvinylidene fluoride (PVDF), polyvinyl alcohol (PVA), and styrene butadiene rubber (SBR).

Suitable solid ionic conductors include, but are not limited to, Li$_3$PO$_4$; Li$_3$PO$_4$Li$_{1+x+y}$(Al, Ga)$_x$(Ti, Ge)$_{2-x}$Si$_y$P$_{3-y}$O$_{12}$, where $0 \leq x \leq 1$ and $0 \leq y \leq 1$; Li$_a$Nb$_b$Ta$_c$O$_d$N$_e$, where $0.1 \leq a \leq 2.5$, $0 \leq b \leq 1$, $0 \leq c \leq 1$, $b+c=1$, $0.1 \leq d \leq 5$, and $0 \leq e \leq 2$; Li$_x$Si$_y$M$_z$O$_v$N$_w$, where $0.3 \leq x \leq 0.46$, $0.05 \leq y \leq 0.15$, $0.016 \leq z \leq 0.05$, $0.42 \leq v \leq 0.05$, $0 \leq x \leq 0.029$, and M is selected from the group consisting of Nb, Ta, and W; mixtures of lithium phosphorus oxynitride and Li$_3$PO$_4$.

In one embodiment, the binder is selected from the group consisting of coal tar, solid ionic conductor, asphalt pitch, a polymeric binder, and mixtures thereof. In another embodiment, the polymer binder is selected from the group consisting of polytetrafluoroethylene, carboxymethyl cellulose, polyvinylidene fluoride, polyvinyl alcohol, and styrene butadiene rubber. In yet another embodiment, the binder is selected from the group consisting of a mixture of lithium nitride and lithium phosphate; a mixture of lithium phosphorus oxynitride and lithium phosphate; Li$_{1+x+y}$(Al, Ga)$_x$(Ti, Ge)$_{2-x}$Si$_y$P$_{3-y}$O$_{12}$, where $0 \leq x \leq 1$ and $0 \leq y \leq 1$; Li$_x$Si$_y$ M$_z$ O$_v$N$_w$ where $0.3 \leq x \leq 0.46$, $0.05 \leq y \leq 0.15$, $0.016 \leq z \leq 0.05$, $0.42 \leq v \leq 0.05$, $0 \leq x \leq 0.029$, and M is selected from the group consisting of Nb, Ta, and W.

In one embodiment, the agglomerates provided herein are microparticles of nanoparticles of LiFePO$_4$ and nanoparticles of LiNi$_x$Co$_{1-x}$O$_2$, in combination with a binder, such as coal tar.

In another embodiment, the agglomerates provided herein are microparticles of nanoparticles of LiMn$_2$O$_4$ and nanoparticles of LiNi$_x$Co$_{1-x}$O$_2$, in combination with a binder, such as coal tar.

In still another embodiment, the agglomerates provided herein are microparticles of nanoparticles of LiFePO$_4$ and nanoparticles of V$_2$O$_5$, in combination with a binder, such as coal tar.

In one embodiment, the agglomerates comprise from about 30 to about 95% by weight of the nanoparticles (type 1) of the first electroactive material, from about 70 to about 5% by weight of the nanoparticles (type 2) of the second electroactive material, and from about 0.1 to about 5% by weight of the binder(s). In another embodiment, the agglomerates comprise from about 50 to about 90% by weight of the nanoparticles (type 1) of the first electroactive material and from about 50 to about 10% by weight of the nanoparticles (type 2) of the second electroactive material, and from about 0.1 to about 5% by weight of the binder(s). In yet another embodiment, the agglomerates comprise from about 60 to about 90% by weight of the nanoparticles of the first electroactive material and from about 80 to about 90% by weight of the nanoparticles of the second electroactive material, and from about 0.1 to about 5% by weight of the binder(s). Nevertheless, the total amount of all the ingredients in the agglomerates should equal to 100%.

Further provided herein are electroactive agglomerated particles, which comprise a first electroactive material and one or more types of nanoparticles of electroactive materials that differ from the first electroactive, wherein the nanoparticles are embedded in the particle of the first electroactive material.

In one embodiment, the embedded electroactive agglomerated particles are microparticles. In certain embodiments, the embedded electroactive agglomerated particles have an average particle size ranging from about 0.1 to about 100 µm, from about 1 to about 50 µm, from about 1 to about 20 µm, from about 1 to about 15 µm, or from about 1 to about 5 µm. In certain embodiments, the electroactive agglomerated particles have an average surface area ranging from about 0.1 to about 100 m$^2$/g, from about 1 to about 50 m$^2$/g, from about 2 to about 20 m$^2$/g, from about 5 to about 20 m$^2$/g, or from about 10 to about 15 m$^2$/g. In certain embodiments, the embedded agglomerated particles have such particle size distribution that 10% of the embedded electroactive agglomerated particles have a particle size of about 0.05 µm, about 0.1 µm, or about 1 µm; and 90% of the embedded electroactive agglomerated particles have a particle size of about 500 µm, about 100 µm, about 50 µm, about 20 µm, about 15 µmor about 5 µm. In certain embodiments, the particle size distribution is that 10% of the embedded electroactive agglomerated particles have a particle size of 1 µm and 90% of the embedded electroactive agglomerated particles have a particle size of 15 µm.

In certain embodiments, each type of nanoparticles in the embedded electroactive agglomerated particles independently have an average particle size ranging from about 1 to about 500 nm, from about 1 to about 200 nm, or from about 2 to about 100 nm. Furthermore, each type of nanoparticles in the embedded electroactive agglomerated particles may independently have various shapes, including, but not limited to, sphere, fibril, or platelet.

The embedded agglomerated particles can further comprise one or more additives, such as carbon. Alternatively, the embedded agglomerated particles can further comprise metals (such as Al, Ti, or Cr), or metal oxides, such as aluminum oxide or zirconium oxide.

The embedded agglomerated particles can be subsequently coated to provide additional desired chemical and/or physical properties, such as chemical inertness (by coating with Al$_2$O$_3$ or ZnO, for example) or electrical conductivity (by coating with, e.g., ionic conductors).

In one embodiment, the embedded electroactive agglomerated particles provided herein comprise one type of nanoparticles, that is, nanoparticles of a second electroactive material.

In one embodiment, the first electroactive material is a lithium compound. In another embodiment, the first electroactive material is a lithium phosphate compound. In yet another embodiment, the first electroactive material is LiMPO$_4$, wherein M is a transition metal. In yet another embodiment, M is a transition metal selected from the group consisting of Ti, V, Cr, Mn, Fe, Co, and Ni. In yet another embodiment, the first electroactive material is LiFePO$_4$. In yet another embodiment, the first electroactive material is LiMnPO$_4$. In yet another embodiment, the first electroactive material is LiVPO$_4$. In yet another embodiment, the first electroactive material is AM$^a_{1-x}$M$^b_x$PO$_4$, wherein A is Li, Na, or a mixture thereof; M$^a$ is Fe, Co, Mn, or a mixture thereof; M$^b$ is Mg, Ca, Zn, Ni, Co, Cu, Al, B, Cr, Nb, or a mixture thereof; and x is from about 0.01 to about 0.99, from about 0.01 to about 0.5, from about 0.01 to about 0.30, or from about 0.01 to about 0.15. In yet another embodiment, the first electroactive material is $LiM^a_{1-x}M^b_xPO_4$. In still another embodiment, the first electroactive material is $NaM^a_{1-x}M^b_xPO_4$.

In another embodiment, the second electroactive material is a metal oxide. In another embodiment, the second electroactive material is selected from the group consisting of $LiCoO_2$, $LiNiCoO_2$, $LiNi_xCo_{1-x}O_2$, wherein x is from about 0.05 to about 0.95, from about 0.1 to about 0.90, from about 0.2 to about 0.5, or from about 0.2 to about 0.4, $Li(NiMnCo)_{1/3}O_2$, $Li(NiMn)_{1/2}O_2$, and $LiV_2O_5$. In yet another embodiment, the second electroactive material is $LiCoO_2$. In yet another embodiment, the second electroactive material is $LiNiCoO_2$. In yet another embodiment, the second electroactive material is $LiNi_xCo_{1-x}O_2$, wherein x is from about 0.05 to about 0.95, from about 0.1 to about 0.90, from about 0.2 to about 0.5, or from about 0.2 to about 0.4. In yet another embodiment, the second electroactive material is $LiNi_xCo_{1-x}O_2$, wherein x is from about 0.2 to about 0.5, from about 0.2 to about 0.4, or about 0.3. In yet another embodiment, the second electroactive material is $Li(NiMnCo)_{1/3}O_2$. In yet another embodiment, the second electroactive material is $Li(NiMn)_{1/2}O_2$. In yet another embodiment, the second electroactive material is $LiV_2O_5$. In yet another embodiment, the second electroactive material is $LiNi_xMn_yCO_{1-x-y}O_2$, wherein x and y are each independently ranging from 0 to about 0.95, from about 0.01 to about 0.9, from about 0.05 to about 0.80, from about 0.1 to about 0.5, or from 0.2 to about 0.4, and x+y is less than 1. In still another embodiment, the second electroactive material is $LiNi_xMn_yCO_{1-x-y}O_2$, wherein x and y are 0.33.

In one embodiment, the embedded electroactive agglomerated particles provided herein are microparticles comprising nanoparticles of $LiFePO_4$ (type 1) and nanoparticles of $LiNi_xCo_{1-x}O_2$ (type 2), wherein x is no less than 0 and no greater than 1, from about 0.05 to about 0.95, from about 0.1 to about 0.90, from about 0.2 to about 0.5, or from about 0.2 to about 0.4. In another embodiment, the second electroactive material is $LiNi_xCo_{1-x}O_2$, wherein x is from about 0.2 to about 0.5, from about 0.2 to about 0.4, or about 0.3.

In yet another embodiment, the embedded electroactive agglomerated particles provided herein are microparticles comprising nanoparticles of $LiMnPO_4$ (type 1) and nanoparticles of $LiNi_xCo_{1-x}O_2$ (type 2), wherein x is no less than 0 and no greater than 1, from about 0.05 to about 0.95, from about 0.1 to about 0.90, from about 0.2 to about 0.5, or from about 0.2 to about 0.4. In another embodiment, the second electroactive material is $LiNi_xCo_{1-x}O_2$, wherein x is from about 0.2 to about 0.5, from about 0.2 to about 0.4, or about 0.3.

In still another embodiment, the embedded electroactive agglomerated particles provided herein are microparticles comprising nanoparticles of $LiFePO_4$ (type 1) and nanoparticles of $V_2O_5$ (type 2).

In one embodiment, the embedded agglomerated particles comprise from about 1 to about 99%, from about 30 to about 95%, from about 50 to about 90%, from about 60% to about 90%, or from about 80% to 90% by weight of the first electroactive material; and from about 99 to about 1%, from about 70 to about 5%, from about 50 to about 10%, from about 40 to about 10%, or from about 20 to about 10% by weight of the second electroactive material. In another embodiment, the embedded agglomerated particles comprise from about 50 to about 90% by weight of the first electroactive material and from about 50 to about 10% by weight of the second electroactive material. In yet another embodiment, the embedded agglomerated particles comprise from about 60 to about 90% by weight of the first electroactive material and from about 40 to about 10% by weight of the second electroactive material. In still another embodiment, the embedded agglomerated particles comprise from about 80 to about 90% by weight of the first electroactive material and from about 20 to about 10% by weight of the second electroactive material.

Methods of Preparation:

Provided herein is a method for preparing the agglomerates provided here, which comprises mixing nanoparticles of a first electroactive material, nanoparticles of a second electroactive material, and one or more binder.

The mixing step can be performed using any conventional method known to an ordinary of skill in the art, including, but not limited to, ball mixing, cospraying, such as thermal spraying and ultrasonic spraying. The production method will depend on the nature of the nanoparticles employed.

In one embodiment, microsized agglomerates of $LiFePO_4$ nanoparticles, metal oxide nanoparticles, and coal tar are prepared by mixing $LiFePO_4$ and metal oxide nanoparticles together; contacting the nanoparticle mixture with a coal tar fume, and ball mixing the nanoparticle mixture.

In another embodiment, microsized agglomerates of $LiFePO_4$ nanoparticles, metal oxide nanoparticles, coal tar, and carbon black are prepared by mixing $LiFePO_4$ and metal oxide nanoparticles together, contacting the nanoparticle mixture with a coal tar fume and carbon black, and ball mixing the nanoparticle mixture.

In yet another embodiment, microsized agglomerates of $LiFePO_4$ nanoparticles, metal oxide nanoparticles, metal nanoparticles (such as Al, Ti, or Cr), and coal tar are prepared by mixing $LiFePO_4$ nanoparticles, metal oxide nanoparticles, and metal nanoparticles together, contacting the nanoparticle mixture with coal tar fume, and ball mixing the nanoparticle mixture.

In yet another embodiment, microsized agglomerates of $LiFePO_4$ nanoparticles and metal oxide nanoparticles, and coal tar, are prepared by air-injecting $LiFePO_4$ nanoparticles, metal oxide nanoparticles, and coal tar, independently and simultaneously, from three tubes into a flowing bed.

In yet another embodiment, microsized agglomerates of $LiFePO_4$ nanoparticles, metal oxide nanoparticles, and coal tar are prepared by air-injecting $LiFePO_4$ nanoparticles, and coal tar, independently and simultaneously, from three tubes into a flowing bed.

In yet another embodiment, microsized agglomerates of $LiFePO_4$ nanoparticles, metal oxide nanoparticles, coal tar, and carbon black are prepared by air-injecting $LiFePO_4$ nanoparticles, metal oxide nanoparticles, coal tar, and carbon black, independently and simultaneously, from four tubes into a flowing bed.

In still another embodiment, microsized agglomerates of $LiFePO_4$ nanoparticles, metal oxide nanoparticles, metal nanoparticles (such as Al, Ti, or Cr), and coal tar, are prepared by air-injecting $LiFePO_4$ nanoparticles, metal oxide nanoparticles, metal nanoparticles, and coal tar, independently and simultaneously, from four tubes into a flowing bed.

Provided herein is a method for preparing the electroactive agglomerated particles provided here, which comprises heating the agglomerates prepared as described herein to an elevated temperature. In one embodiment, the elevated temperature is ranging from about 200 to about 1000° C., from about 250 to about 750° C., from about 300 to about 700° C., or from about 400 to about 600° C.

EXAMPLES

Example 1

Electrode and Cell Fabrication

Negative and positive electrodes were coated onto an Al foil and Cu foil, respectively, using a small doctor blade coater, and then calendared to designed thickness. Then the electrodes were silted to designed width and dried in a vacuum oven at high temperature. Once the electrodes were dried, all subsequently cell fabrication steps were carried out inside a drying room at a Dew point of about −35° C. The electrodes were tabbed first and then wound into jellyrolls. The jellyrolls were then inserted into an 18650 can and an EC based electrolyte would be put into the cell under vacuum. The cells were crimped for sealing after electrolyte filling. The cell was then be aged and formed.

Example 2

Cell Testing

The cell was tested one week after the formation. The cell capacities and voltage profiles at ~1 C and ~5 C (or ~10 C for the Mn mixed particle) were measured by the following procedure: i) the cell was charged to 3.9V at 0.6 A for 2.5 hours; ii) the cell then rested for several minutes; iii) the cell was discharged to 2.2 V at 1 C rate; iv) the cell rested for another several minutes; v) the cell was then charged to 3.9V at 0.6 A; vi) the cell rested for several minutes; and vii) the cell was discharged to 2.2 V at ~5 C or ~10 C depending on the mixed particles.

Example 3

Preparation of Agglomerated Particles (Method 1)

Microsized agglomerates of $LiFePO_4$ nanoparticles, metal oxide nanoparticles, coal tar, and carbon black were prepared by mixing $LiFePO_4$ and metal oxide nanoparticles together, contacting the nanoparticle mixture with a coal tar fume and carbon black, and ball mixing the nanoparticle mixture. The metal oxide particles used herein are $LiMn_2O_4$, $Li(NiCoMn)_{1/3}O_2$, and $Li(NiCoMn)_{1/3}O_2$ nanoparticles.

Example 4

Preparation of Agglomerated Particles (Method 2)

$Fe_2O_3$ is mixed with $Li_2CO_3$ and $(NH_4)_2HPO_4$ in the presence of carbon. To the mixture is then added nanoparticles of a second electroactive material and then thoroughly mixed again. The resulting mixture is heated under $N_2$ at an elevated temperature from about 700 to about 850° C., to yield microsized agglomerates, each of which comprises $LiFePO_4$ nanoparticles and the metal oxide nanoparticles.

Example 5

Preparation of Agglomerated Particles (Method 3)

$Fe_2O_3$ particles are mixed with $LiH_2PO_4$ and $Mg(OH)_2$ particles in the presence of carbon. To the mixture is then added nanoparticles of a second electroactive material and then thoroughly mixed again. The resulting mixture is heated under $N_2$ at an elevated temperature from about 700 to about 850° C., to yield microsized agglomerates, each of which comprises $LiFe_{1-x}Mg_xPO_4$ nanoparticles and the metal oxide nanoparticles.

Example 6

Preparation of Agglomerated Particles (Method 4)

$LiFePO_4$ is prepared via a sol-gel synthesis from $Fe(NO_3)_3 9H_2O$, lithium acetate dehydrate, and phosphoric acid (85%). The iron nitrate and lithium acetate are combined with phosphoric acid (85%) in a stoichiometric ratio of 1:1:1. Distilled water is then added until all the constituents are completely dissolved. Nanoparticles of a second electroactive material, such as a metal oxide, are added. The pH of the mixture is adjusted to 8.5 to 9.5 using $NH_4OH$ to form a sol. The sol is then heated on a hot plate with stirring to form a gel. The sample is then fired to 500° C. The mixture is then ground using a planetary ball mill in a solvent, such as ethanol and acetone. The grinding solvent is then evaporated under nitrogen and the resulting powder is thoroughly mixed and fired to about 600° C. to yield embedded microsized particles which comprises $LiFePO_4$ nanoparticles and the metal oxide nanoparticles.

The examples set forth above are provided to give those of ordinary skill in the art with a complete disclosure and description of how to make and use the claimed embodiments, and are not intended to limit the scope of what is disclosed herein. Modifications that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. Electroactive agglomerated particles comprising nanoparticles of a first electroactive material, nanoparticles of a second electroactive material, and a binder, wherein the agglomerated particles have an average particle size ranging from about 0.1 µm to about 100 µm; wherein the first electroactive material is $LiMPO_4$, where M is a transition metal selected from the group consisting of Ti, V, Cr, Mn, Fe, Co, and Ni; and wherein the second electroactive material is a $Li(NiMnCo)_{1/3}O_2$.

2. The agglomerated particles of claim 1, wherein the first electroactive material is selected from the group consisting of $LiFePO_4$, $LiMnPO_4$, $LiVPO_4$, and mixtures thereof.

3. The agglomerated particles of claim 1, wherein the first electroactive material is $LiFePO_4$.

4. The agglomerated particles of claim 1, comprising from about 50 to about 80% by weight of the nanoparticles of the first electroactive material and from about 50 to about 20% by weight of the nanoparticles of the second electroactive material.

5. The agglomerated particles of claim 1, further comprising one or more additives.

6. The agglomerated particles of claim 5, wherein the additive is carbon.

7. The agglomerated particles of claim 1, further comprising a metal or metal oxide.

8. The agglomerated particles of claim 7, wherein the metal is Al, Ti, or Cr.

9. The agglomerated particles of claim 1, wherein the binder is selected from the group consisting of coal tar, solid ionic conductor, asphalt pitch, a polymeric binder, and mixtures thereof.

10. The agglomerated particles of claim 1, comprising from about 50 to about 80% by weight of the nanoparticles of the first electroactive material, from about 50 to about 20% by weight of the nanoparticles of the second electroactive material, and from about 0.1 to about 5% by weight of the binder.

11. The agglomerated particles of claim 1, comprising about 50% by weight of the nanoparticles of $LiFePO_4$ and about 50% by weight of the nanoparticles of Li(NiMn Co)$_{1/3}$O$_2$.

12. The agglomerated particles of claim 1, comprising about 80% by weight of the nanoparticles of LiFePO$_4$ and about 20% by weight of the nanoparticles of Li(NiMn Co)$_{1/3}$O$_2$.

13. The agglomerated particles of claim 1, wherein the agglomerated particles have an average particle size ranging from about 1 μm to about 15 μm.

14. The agglomerated particles of claim 1, wherein the binder is coal tar.

* * * * *